(12) United States Patent
Feyrer

(10) Patent No.: US 10,850,932 B2
(45) Date of Patent: Dec. 1, 2020

(54) POSITIONING SYSTEM COMPRISING A WINDING ARRANGEMENT

(71) Applicant: Festo SE & Co. KG, Esslingen (DE)

(72) Inventor: Thomas Feyrer, Esslingen (DE)

(73) Assignee: FESTO SE & CO. KG, Esslingen (DE)

( * ) Notice: Subject to any disclaimer, the term of this patent is extended or adjusted under 35 U.S.C. 154(b) by 436 days.

(21) Appl. No.: 15/751,386

(22) PCT Filed: Aug. 11, 2015

(86) PCT No.: PCT/EP2015/068462
§ 371 (c)(1),
(2) Date: Feb. 8, 2018

(87) PCT Pub. No.: WO2017/025137
PCT Pub. Date: Feb. 16, 2017

(65) Prior Publication Data
US 2020/0223645 A1 Jul. 16, 2020

(51) Int. Cl.
*B65G 54/02* (2006.01)

(52) U.S. Cl.
CPC .................... *B65G 54/02* (2013.01)

(58) Field of Classification Search
CPC ..................................... B65G 54/02
See application file for complete search history.

(56) References Cited

U.S. PATENT DOCUMENTS

| 5,251,741 A | 10/1993 | Morishita et al. |
| 5,528,118 A * | 6/1996 | Lee ............. G03F 7/70716 318/568.17 |
| 6,097,114 A * | 8/2000 | Hazelton ........ G03F 7/70758 310/12.06 |

FOREIGN PATENT DOCUMENTS

| DE | 1920556 | 4/1969 |
| DE | 102011075445 | 11/2012 |
| EP | 0896936 | 2/1999 |
| WO | WO0010242 | 2/2000 |

* cited by examiner

*Primary Examiner* — Kyle O Logan
(74) *Attorney, Agent, or Firm* — Hoffmann & Baron, LLP

(57) ABSTRACT

A positioning system has at least one positioning carriage which is variably mobile and positionable relative to a carriage support of the positioning system, whilst carrying out a positioning movement on a positioning plane defined by an xy cartesian co-ordinate system. The carriage support has at least one stator arrangement having a winding arrangement with an x-winding section for providing a magnetic x-travelling field, which can be moved in the direction of the x-axis of the xy co-ordinate system, and a y-winding section for providing a magnetic y-travelling field, which can be moved in the direction of the y-axis of the xy co-ordinate system. The positioning carriage is provided with a coupling arrangement which, during the positioning movement, magnetically interacts simultaneously with the x-travelling field and the y-travelling field.

13 Claims, 12 Drawing Sheets

POSITIONING SYSTEM COMPRISING A WINDING ARRANGEMENT

This application claims priority based on an International Application filed under the Patent Cooperation Treaty, PCT/EP2015/068462, filed Aug. 11, 2015.

BACKGROUND OF THE INVENTION

The invention relates to a positioning system comprising at least one positioning carriage which is variably movable and positionable relative to a carriage support of the positioning system, whilst carrying out a positioning movement on a positioning plane defined by an xy cartesian coordinate system.

A positioning system known from DE 1920556 A contains a positioning carriage formed as a table top, said positioning carriage being two-dimensionally adjustable relative to a frame-shaped carriage support on a positioning plane spanned by a cartesian coordinate system. The positioning system comprises an x-driving gearwheel and a y-driving gearwheel which are rotatably mounted on the carriage support and the rotational axes of which are aligned at right angles to one another. Several gear racks formed on the positioning carriage and running at right angles to one another are in toothed engagement with each of these driving gearwheels. Through overlapping rotational movements of the x-driving gearwheel and of the y-driving gearwheel, positioning movements of the positing carriage can be generated, in which movement directions in the direction of the x-axis and in the direction of the y-axis overlap.

The object of the invention is to provide an improved positioning system.

SUMMARY OF THE INVENTION

This object is achieved for a positioning system of the type referred to at the beginning having the features of claim 1.

The carriage support of the positioning system according to the invention has at least one stator arrangement comprising a winding arrangement. The winding arrangement has an x-winding section for providing a magnetic x-travelling field, which can be moved in the direction of the x-axis of the xy coordinate system, and a y-winding section for providing a magnetic y-travelling field, which can be moved in the direction of the y-axis of the xy coordinate system. The positioning carriage is provided with a coupling arrangement which, during the positioning movement, magnetically interacts simultaneously with the x-travelling field and the y-travelling field. The positioning carriage can be driven to carry out a positioning movement in the direction of the x-axis of the xy coordinate system by the movement of the x-travelling field and to carry out a positioning movement in the direction of the y-axis of the xy coordinate system by the movement of the y-travelling field. The x-winding section and the y-winding section are arranged parallel to the positioning plane and take up, at least partially, the same xy region in the xy coordinate system, such that the x-travelling field and the y-travelling field overlap in this xy region.

The x-travelling field is formed in such a way that the movement or position of the positioning carriage in the direction of the x-axis is determined by the movement of the x-travelling field. For this purpose, the carriage support is formed, in particular, to generate a magnetic field comprising a plurality of wave fronts parallel to the direction of the y-axis as an x-travelling field. Preferably, the x-travelling field comprises sections having maximum magnetic field strength along the direction of the x-axis at periodic intervals. The magnetic field direction of these sections alternates preferably along the direction of the x-axis. The sections of maximum field strength are also referred to below as north pole sections and south pole sections. The x-travelling field is preferably substantially constant in the direction of the y-axis.

The y-travelling field is formed in correspondence to the previously described x-travelling field. I.e. the y-travelling field is formed in such a way that the movement or position of the positioning carriage in the direction of the y-axis is determined by the y-travelling field. Expediently, the carriage support is formed to generate a magnetic field comprising a plurality of wave fronts parallel to the direction of the x-axis as a y-travelling field. Preferably the y-travelling field comprises sections having maximum magnetic field strength periodically along the direction of the y-axis. The magnetic field direction of these sections alternates preferably along the direction of the y-axis. In particular, the y-travelling field comprises north pole sections and south pole sections alternately along the direction of the y-axis. The y-travelling field is preferably substantially constant in the direction of the x-axis.

A shifting of the positioning carriage in the direction of the x-axis can be effected by means of a magnetic x-travelling field generated by the x-winding section and moving in the direction of the x-axis, and the drive interaction resulting therefrom between the magnetic x-travelling field and the coupling arrangement, wherein the coupling arrangement magnetically interacts simultaneously with the magnetic y-travelling field, is guided to an extent in the direction of the x-axis in a linearly displaceable manner, since the y-travelling field as previously described is substantially constant in the direction of the x-axis. This also takes place comparably, in the inversed sense, in the case of a magnetic y-travelling field generated by the y-winding section and moving in the direction of the y-axis. Through movement adjusted with respect to one another of at least one x-travelling field interacting magnetically with the coupling arrangement and a y-travelling field likewise simultaneously magnetically interacting with the coupling arrangement, the positioning carriage can be shifted on the positioning plane with each desired movement direction. The possibility of the interaction of the coupling arrangement with both the at least one x-travelling field and the at least one y-travelling field makes it possible to implement a two-dimensionally relatively large positioning region of the positioning carriage. In particular, the advantage also exists that the base area of the carriage support is able to be used optimally for the positioning movement of the positioning carriage, wherein even an arrangement is possible in which the positioning carriage surpasses the carriage support at the edge side.

According to the invention, the x-winding section and the y-winding section are arranged parallel to the positioning plane and take up, at least partially, the same xy region in the xy coordinate system, such that the x-travelling field and the y-travelling field overlap in this xy region. This means that the x-winding section and the y-winding section overlap. Preferably the two winding sections therein overlap completely. The overlapping of the winding sections achieves, in particular, the advantage that the area of the carriage support is used more efficiently and magnetic travelling fields extending over a greater region both in the direction of the x-axis and in the direction of the y-axis can thereby be provided.

Due to the overlapping of the winding sections, the magnetic travelling fields generated by the winding sections are overlapped. If the magnetic travelling fields, as previously described, have a plurality of parallel wave fronts respectively, then a resulting magnetic field, the magnetic field strength of which has a plurality of maxima and minima distributed in a matrix-type manner over the overlapping area of the winding sections, results due to the overlapping of the two travelling fields.

Preferably the wires of the winding sections are therein arranged in such a way and/or are energised by the carriage support in such a way that a magnetic field resulting from the overlapping results, which comprises a plurality of magnetic north and south pole sections distributed on a plane parallel to the positioning plane, said pole sections being placed on crossing points of x-grid lines and y-grid lines, which are at right angles to one another, of an imaginary cross grid in such a way that pole sections placed on the same x-grid lines have, among one another, the same pole alignment and pole sections placed on the same y-grid lines have, among one another, the same pole alignment, wherein the pole alignment of the pole sections alternate in the diagonal direction of the xy coordinate system.

The wires of the winding sections are, for example, formed as copper wires. Alternatively to this, the wires can also consist of a superconductive material. The carriage support of the positioning system can be conceived as a single support unit which provides at least one x-winding section and at least one y-winding section which can, however, also be equipped with several x-winding sections and several y-winding sections.

Advantageous developments of the invention emerge from the sub-claims.

In one embodiment of the invention it is provided that the x-winding section comprises a plurality of x-wire sections running in the direction of the y-axis and arranged one next to the other in an x-plane parallel to the positioning plane, the y-winding section comprises a plurality of y-wire sections running in the direction of the x-axis and arranged one next to the other in a y-plane parallel to the positioning plane, and the x-wire sections and the y-wire sections are arranged one over the other in the direction perpendicular to the positioning plane such that, in the top view onto the xy coordinate system, a plurality of crossing points between the x-wire sections and the y-wire sections result. Preferably the winding sections take up right-angled, in particular square, areas.

In a further embodiment of the invention it is provided that the xy region which is taken up by both the x-winding section and the y-winding section is greater than the xy region which is taken up only by the x-winding section, and is greater than the xy region which is taken up only by the y-winding section.

In a further embodiment of the invention it is provided that a plurality of x-planes and y-planes is provided which are stacked alternately one over the other in the direction perpendicular to the positioning plane.

In a further embodiment of the invention it is provided that the x-wire sections are divided into different x-wire section groups respectively, x-wire sections of different x-wire section groups are arranged one next to the other on an x-plane, and this arrangement is repeated periodically along the direction of the x-axis, wherein two x-wire sections of the same x-wire section group are connected to each other at a side edge of the winding arrangement via a connecting section respectively, and the y-wire sections are divided into different y-wire section groups respectively, y-wire sections of different y-wire section groups are arranged one next to the other on a y-plane, and this arrangement is repeated periodically along the direction of the y-axis, wherein two y-wire sections of the same y-wire section group are connected to each other at a side edge of the winding arrangement via a connecting section respectively.

In a further embodiment of the invention it is provided that the connecting sections are bent upwards or downwards in the direction perpendicular to the positioning plane.

In a further embodiment of the invention it is provided that x-wire sections of the same x-wire section group of different x-planes are connected to one another, and that y-wire sections of the same y-wire section group of different y-planes are connected to one another.

In a further embodiment of the invention it is provided that the x-wire sections of the same x-wire section group of all x-planes are connected to one another in series such that they form a single continuous x-wire, and that the y-wire sections of the same y-wire section group of all y-planes are connected to one another in series such that they form a single y-wire.

In a further embodiment of the invention it is provided that the coupling arrangement is a magnet arrangement which has a plurality of magnetic poles distributed in a plane parallel to the positioning plane, said poles being placed on the crossing points of x-grid lines and y-grid lines, which are at right angles to one another, of an imaginary cross grid in such a way that magnetic poles placed on the same x-grid lines have, among one another, the same pole alignment and that magnetic poles placed on the same y-grid lines have, among one another, the same pole alignment, wherein the pole alignment of the magnetic poles alternates in the diagonal direction of the xy coordinate system.

Correspondingly, the magnet arrangement of the positioning carriage has a plurality of magnetic poles distributed on a plane parallel to the positioning plane. The magnetic poles are, in particular, magnetic north and south poles aligned perpendicularly to the positioning plane. The poles can, for example, be provided by a plurality of permanent magnets which are aligned in their magnetising direction perpendicularly to the positioning plane. The magnetic poles referred to below are therein preferably the poles of the permanent magnets aligned towards the carriage support.

The magnetic poles are therefore placed on crossing points of an imaginary cross grid and then arranged in a matrix-type manner. Therein only magnetic poles which have, among one another, the same pole alignment, are placed on the same x-grid lines respectively. In particular, therein, exclusively magnetic north poles or exclusively magnetic south poles are placed on the x-grid lines respectively. For example, exclusively magnetic north poles are placed on a first x-grid line and exclusively magnetic south poles are placed on a second x-grid line. In particular, therein, magnetic north and south poles are not provided simultaneously on the x-grid lines. An x-grid line on which exclusively magnetic north poles or south poles are placed is also referred to below as a north pole or south pole row.

In accordance with the placing described above in relation to the x-grid lines, only magnetic poles which have, among one another, the same pole alignment are placed on the same y-grid lines respectively. In particular, therein, exclusively magnetic north poles or exclusively magnetic south poles are placed on the y-grid lines respectively. A y-grid line on which exclusively magnetic north poles or south poles are placed is also referred to below as a north pole or south pole column.

As referred to above, the magnetic poles are additionally arranged on the imaginary cross grid in such a way that the pole alignment of the magnetic poles alternates in the diagonal direction of the xy coordinate system.

Seen together with the property discussed above that only magnetic poles with the same pole alignment are placed on the x- and y-grid lines respectively, a matrix-type magnet arrangement therefore results, in which north pole rows and south pole rows are arranged alternately with respect to one another in the direction of the y-axis and north pole columns and south pole columns are arranged alternately with respect to one another in the direction of the x-axis. Therein, no magnetic pole is provided on each second crossing point in the direction of the x-axis and in the direction of the y-axis. The magnetic poles of adjacent rows are displaced with respect to each other by one crossing point in the direction of the x-axis respectively, and the magnetic poles of adjacent columns are displaced with respect to each other by one crossing point in the direction of the y-axis.

The cross grid defining the distribution of the magnetic poles expediently has a regular structure, wherein the x-grid lines have, among one another, in particular the same spacing as the y-grid lines. The magnet arrangement is expediently located on a lower side of the positioning carriage facing towards the carriage support.

In particular, therein, the carriage support is formed to generate the magnetic travelling fields in such a way that the magnetic pole sections of the resulting magnetic field are arranged inversely to the north and south poles of the magnet arrangement described above. Expediently, the resulting magnetic field is formed in such a way that magnetic south poles are formed on the crossing points of the imaginary cross grid which are occupied with north poles of the magnet arrangement, and magnetic north poles are formed on the crossing points which are occupied with south poles of the magnet arrangement. In this way, the magnet arrangement can be driven or carried along particularly well by the resulting magnetic field. Herein, poles of the magnet arrangement which are repelled by the south pole sections of the resulting magnetic field and are attracted by the north pole sections of the resulting magnetic field are referred to as "south poles". In an analogous manner, the poles of the magnet arrangement which are repelled by the north pole sections of the resulting magnetic field and are attracted by the south pole sections of the resulting magnetic field are referred to as "north poles".

Expediently, the distance between two adjacent sections of maximum magnetic field strength—so the distance between a north pole section and an adjacent south pole section—corresponds to the distance between two crossing points on an x-grid line or y-grid line of the previously described imaginary cross grid of the magnet arrangement, or a fraction or multiples thereof.

In a further embodiment of the invention it is provided that the coupling arrangement is a superconductor arrangement.

In a further embodiment of the invention it is provided that the superconductor arrangement comprises a first group of superconductor sections in which magnetic field geometries of a first pole alignment are impressed respectively, and comprises a second group of superconductor sections in which magnetic field geometries of a second pole alignment opposite to the first pole alignment are impressed respectively, wherein the superconductor sections are distributed on a plane parallel to the positioning plane and are placed on crossing points of x-grid lines and y-grid lines, which are at right angles to one another, of an imaginary cross grid in such a way that superconductor sections placed on the same x-grid lines have, among one another, the same pole alignment and that superconductor sections placed on the same y-grid lines have, among one another, the same pole alignment, wherein the pole alignment of the superconductor sections alternates in the diagonal direction of the xy coordinate system.

In a further embodiment of the invention it is provided that the bearing device has an air bearing plate which has a plurality of air outlet openings on the side facing towards the positioning carriage for providing an air bearing supporting the positioning carriage.

Expediently, the air bearing plate is arranged on a plane parallel to the positioning plane. Preferably a plurality of air bearing plates is provided which are supported on the carriage support, arranged next to each other. In particular, the air bearing plates therein have a right-angled, preferably a square, outline. Preferably, the air bearing plates are glass plates. Alternatively to this, the air bearing plates can be produced from a porous material, wherein then pores arranged on the upper side—so the side facing towards the positioned carriage—serve as the previously referred to air outlet openings.

Preferably the at least one positioning carriage is loosely supported with its magnet arrangement on the air bearing plate via the stator arrangement. The magnet arrangement is preferably constantly supported simultaneously via at least one x-winding section and at least one y-winding section.

The positioning carriage can be supported, in particular, with a magnet arrangement arranged on its lower side, from above on the air bearing plate via the x-winding section and the y-winding section. Therein, the advantageous possibility exists to apply each positioning carriage simply from above to the carriage support or the air bearing plate during assembly of the positioning system. Conversely, each positioning carriage can also be removed again from the carriage support by simple lifting when needed. The positioning carriage expediently does not have a component which reaches under a component of the carriage support.

In a further embodiment of the invention it is provided that the carriage support has at least one winding chamber in which the winding arrangement is arranged, wherein the winding chamber is closed towards the positioning carriage by the air bearing plate and has a compressed air inlet on the side of the winding arrangement facing away from the air bearing plate, such that air bearing compressed air provided at the compressed air inlet must flow through the winding chamber and the winding arrangement in order to reach the air outlet openings.

The winding arrangement is then accommodated in the carriage support in a winding chamber. Upwards—so towards the positioning carriage—this winding chamber is covered or closed by the previously described air bearing plate. As previously described, a plurality of air outlet openings is provided in the air bearing plate, from which supplied compressed air can escape in order to thus support the positioning carriage. The carriage support is therein formed in such a way that the supplied compressed air firstly flows through the winding chamber, and therefore also the winding arrangement, before it reaches the air outlet openings and escapes from these. This is achieved in that the compressed air inlet is arranged on a side of the winding arrangement facing away from the air bearing plate, such that the supplied compressed air must inevitably flow through the winding arrangement in order to reach the air outlet openings. For example, for this, the compressed air inlet is located on the base of the winding chamber. Expediently, the winding chamber is therein formed to be air-tight except for the air outlet openings and the compressed air inlet. Through the described embodiment of the winding chamber, the advantage is achieved that the winding arrangement can be cooled with the compressed air supplied for providing the air bearing.

In a further embodiment of the invention it is provided that the carriage support is provided with a control circuit which is formed to supply several currents, which are phase-shifted with respect to one another, to at least one x-winding section and at least one y-winding section, to provide the respective travelling field.

The control circuit is therein formed, in particular, to energise the x and y-winding section in such a way that travelling fields are provided with a predetermined formation and movement speed. In this context it is mentioned that a travelling field does not necessarily have to be moving, but depending on the desired positioning of the positioning carriage, can also be stationary in the direction of the x-axis or direction of the y-axis. Furthermore, the travelling field does not necessarily have to move continuously, but can instead also be displaced cyclically to carry out the desired positioning movement.

Possible energising of a winding section to generate a magnetic travelling field with a desired formation and movement speed are already known from the technical field of electromagnetic synchronous linear motors and are therefore not explained in detail at this point. For example, wires of a winding section can be energised with sinusoidal currents, which are phase-shifted with respect to one another respectively, in order to provide such a magnetic travelling field.

Expediently, the magnetic travelling fields can be moved independently of one another by means of the control circuit. The travelling fields can be moved forward and/or backward along the direction of the x-axis or direction of the y-axis. Also, different movement speeds for the travelling fields can also be provided, in particular, in such a way that the one travelling field moves with a different speed to the other travelling field. Expediently, the control circuit is formed to move the travelling fields in a coordinated manner in order to implement a respectively desired movement direction and movement speed of the positioning movement.

In a further embodiment of the invention it is provided that the carriage support comprises a plurality of support modules which are able to be arranged one after another or are arranged one after another modularly in the direction of the x-axis and/or in the direction of the y-axis, and which contain an x-winding section and a y-winding section respectively, wherein one and the same positioning carriage is mobile over more, and expediently over all, the support modules during its positioning movement.

Such a modular carriage support contains a plurality of support modules which are able to be arranged one after another or are arranged one after another modularly in the direction of the x-axis and/or in the direction of the y-axis to form the carriage support. Of these support modules, each support module contains at least one and preferably exactly one x-winding section and at least one and preferably exactly one y-winding section. Preferably, the support modules arranged one after another are fastened to a support base plate. Preferably fastening means are present which fix the support modules arranged one after another to the support base plate, wherein they can be, for example, screw fastening systems or also latch connection systems. Alternatively, the support modules arranged one after another can also be welded to the support base plate. All support modules together form a module matrix representing the carriage support. The modular structure enables carriage supports with different planar extents and/or different outer contours to be implemented, to meet the needs of application specific circumstances.

The advantageous equipment features referred to above in connection with the carriage support expediently apply to each individual support module in the case of the modular structure.

In a further embodiment of the invention it is provided that the at least one positioning carriage is formed as a product support which is able to be equipped directly or indirectly with at least one product to be positioned.

The positioning carriage can be equipped with fastening means which enable a preferably releasable fixing of at least one product. The possibility also exists, however, to use the positioning carriage as a base support for an actual product support, wherein the actual product support can be, for example, a so-called microtiter plate which is able to be used for storing or for transporting fluid samples.

In a further embodiment of the invention it is provided that the at least one positioning carriage has a rectangular outline and/or is formed to be planar.

Preferably, the positioning carriage represents a pallet. The magnet arrangement expediently has a rectangular outer contour with four edge regions which are at right angles to one another.

In a further embodiment of the invention it is provided that the base area of the magnet arrangement of at least one positioning carriage is greater than the base area of the carriage support or of each support module.

If the carriage support is assembled modularly from several support modules arranged one after another, the possibility exists for one and the same positioning carriage to move over more, and expediently over all, support modules. Through coordinated operation of the stator arrangements of the individual support modules, the positioning carriage can be "transferred" between adjacent support modules during its positioning movement without problem. For example, it can be detected by means of an integrated magnetic field measurement if a positioning carriage leaves a support module and magnetically interacts with a stator section of an adjacent support module. Correspondingly, the control circuit can then activate or deactivate certain support modules such that only the support modules which also actually contribute or are necessary to drive a positioning carriage are energised respectively in order to provide the corresponding magnetic travelling fields. Understandably, additionally or alternatively, other detection means can also be present in order to monitor the present position of the positioning carriage and to process this during its control.

BRIEF DESCRIPTION OF THE DRAWINGS

Below, the invention is explained in more detail by means of the enclosed drawings. In these are shown.

DETAILED DESCRIPTION OF THE PREFERRED EMBODIMENTS

Figure 1:
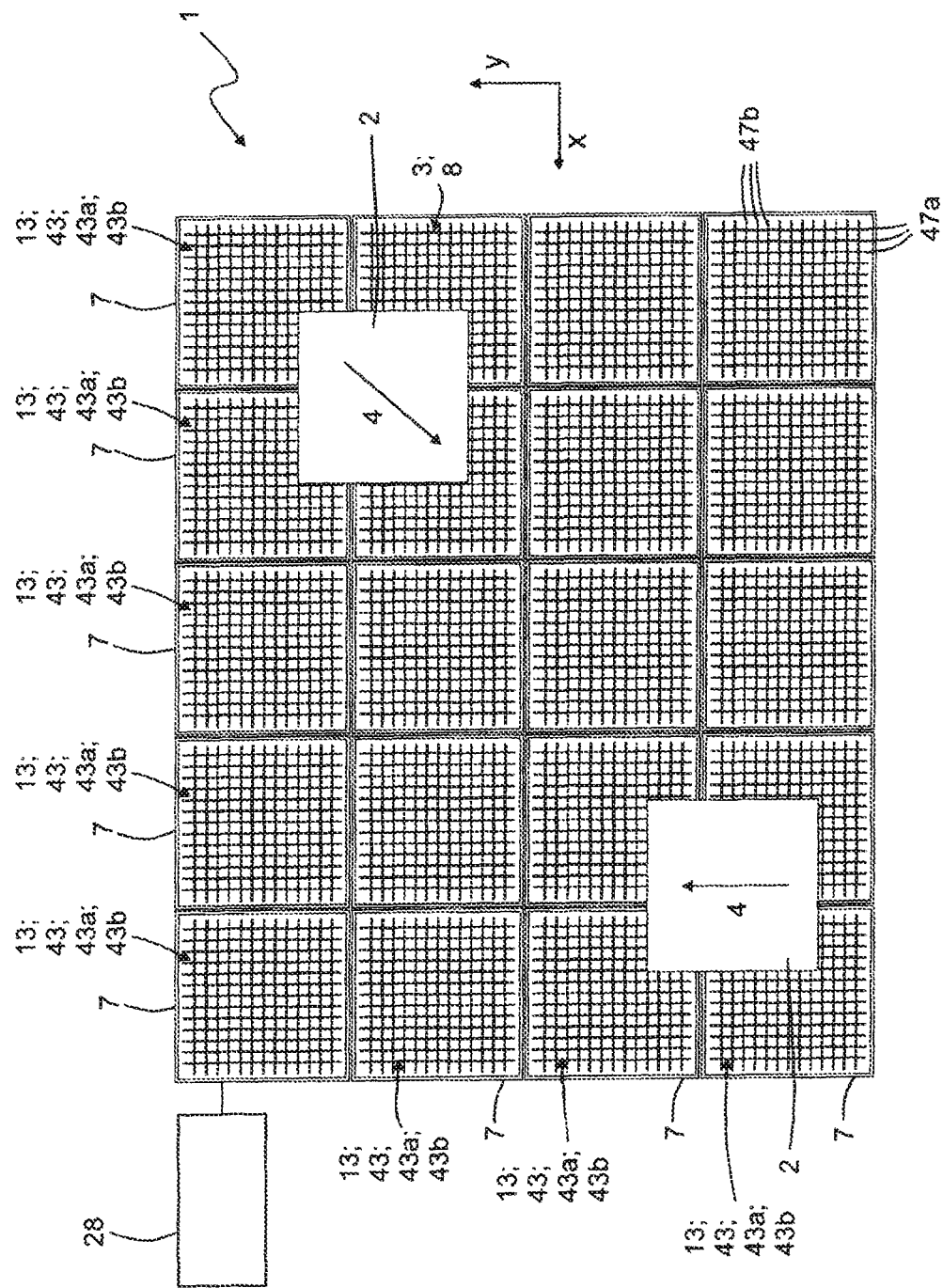
FIG. 1 a top view onto a positioning system with a view perpendicular to an xy plane, wherein the carriage support of the positioning system has a modular structure and comprises several support modules arranged one after another two-dimensionally, FIG. 2 an isometric depiction of a support module of the positioning system shown in FIG. 1 in which the x-winding section and the y-winding section overlap.

In the description of the Figures below, the same references are used for functionally identical components of the depicted embodiments respectively, wherein multiple descriptions of functionally identical components are omitted.

With respect to the illustrations of FIGS. 2, 9, 10 and 11 it must be said that the module shown here can also represent an independent positioning system in which the entire carriage support consists of a single support module which is not necessarily designed for arranging one after another with further support modules. The entire carriage support of the positioning system can here uniformly consist of a single support module.

The positioning system referred to in its entirety with reference numeral 1 contains at least one positioning carriage 2 which is mounted on a carriage support 3 functioning as the basis of the positioning system 1, and is variably mobile and positionable relative to the carriage support 3 on a positioning plane 5 whilst carrying out a positioning movement 4 illustrated by arrows.

Figure 11:
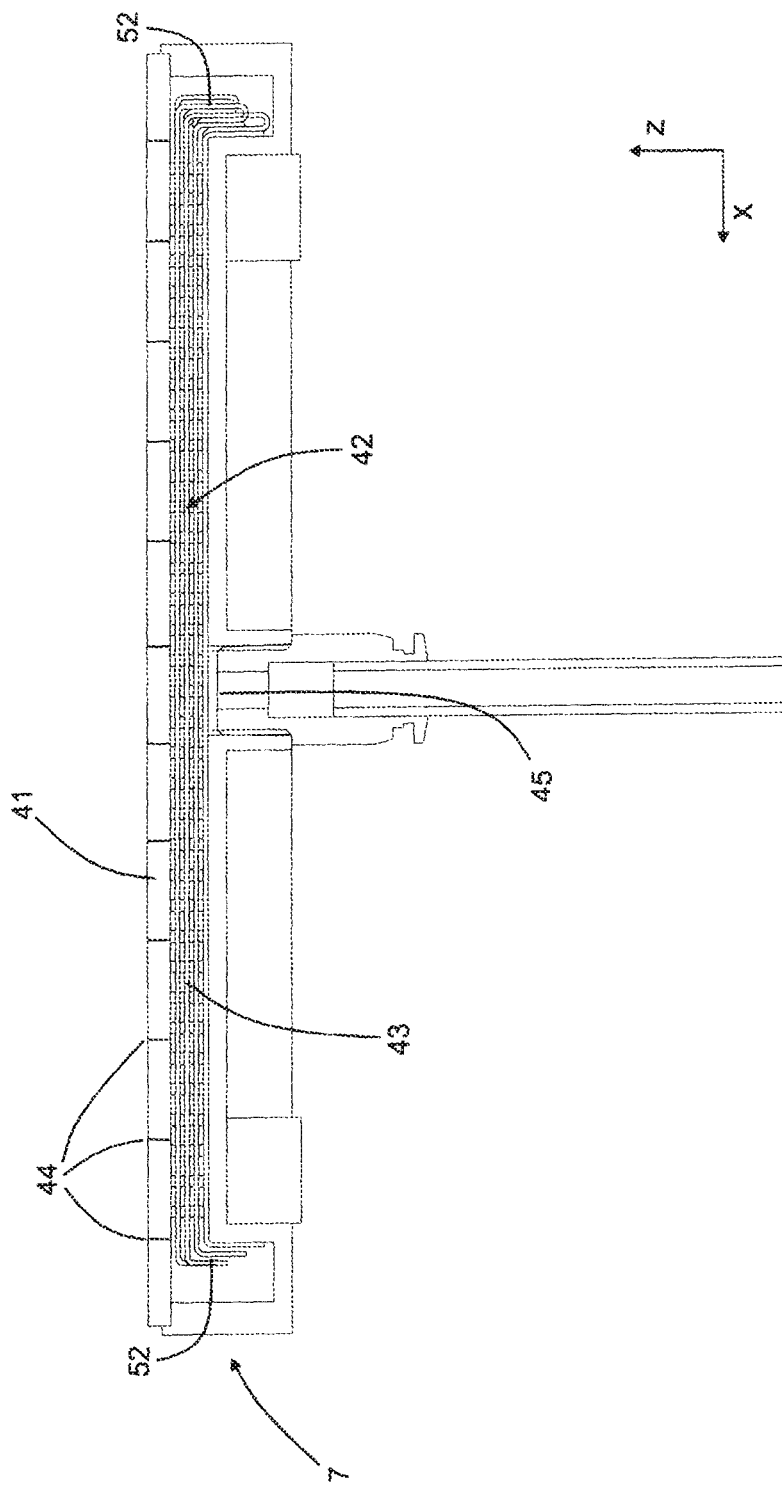
FIG. 11 a sectional depiction of a support module having an air bearing plate and a compressed air inlet, FIG. 12 a sectional depiction of two support modules arranged one next to the other, on which a positioning carriage is arranged.
Figure 12:
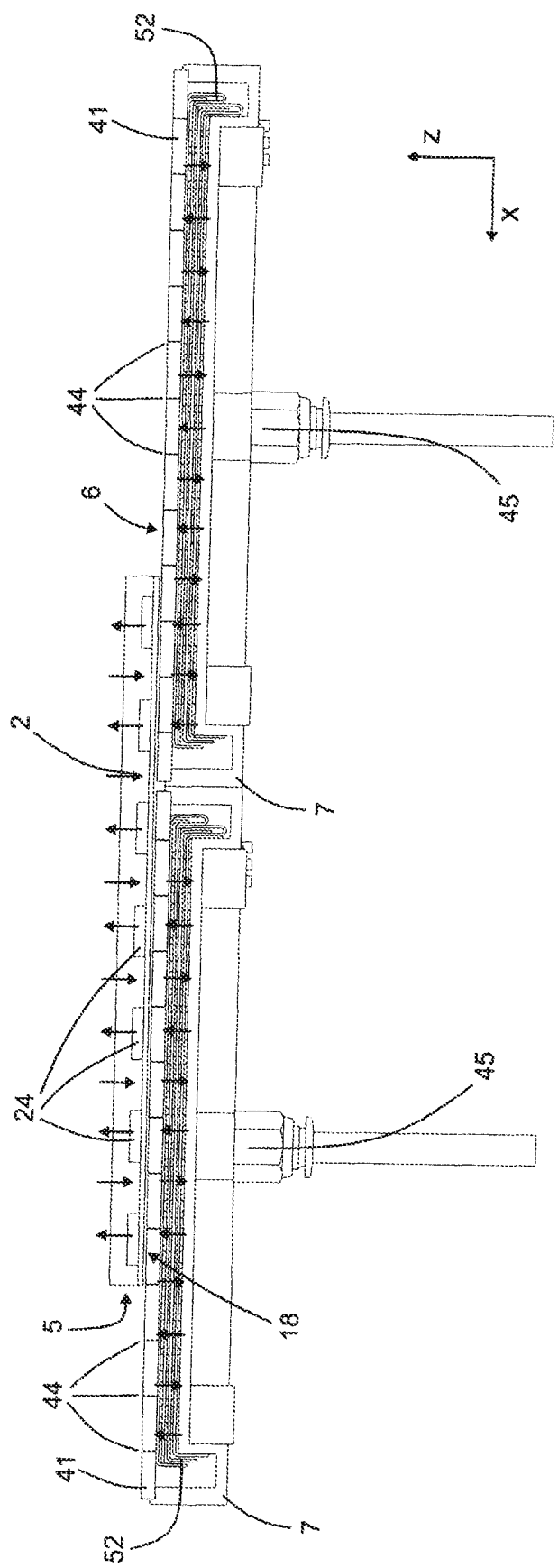

The positioning plane 5 is defined by an xy cartesian coordinate system which has an x-axis and an y-axis orthogonal to this. The x-axis direction is also referred to below as the direction of the x-axis, the y-axis direction is also referred to below as the direction of the y-axis. In FIGS. 1, 4a, 4b and 7, the x-axis and the y-axis, and consequently the positioning plane 5, run parallel to the drawing plane. In FIGS. 5, 11 and 12, the positioning plane 5 runs perpendicularly to the drawing plane.

In a usual orientation for use of the positioning system 1, the positioning plane 5 is defined by a horizontal plane.

The carriage support 3 has a support upper side 6 which points vertically upwards in the usual orientation for use of the positioning system 1. The at least one positioning carriage 2 is arranged on the support upper side 6 on the carriage support 3.

FIG. 1 illustrates a first embodiment of the positioning system 1 according to the invention. The positioning system 1 here comprises several positioning carriages 2, the number of the positioning carriages 2 is, however, in principle, arbitrary. The positioning system 1 can also be equipped with only a single positioning carriage 2. References made below to a positioning carriage 2 are to be understood to be references to all respectively present positioning carriages 2.

The carriage support 3 expediently has a modular structure and is assembled from a plurality of individual support modules 7. These support modules 7 are able to be arranged one next to another in an arbitrary manner whilst forming a two-dimensional module matrix in the xy plane, and in particular are also able to be coupled mechanically to one another and/or to a support base plate 46 such that a solid or connected structure results.

The carriage support 3 has a preferably planar basic body structure 8. In addition to this basic body structure 8, the carriage support 3 can additionally have a control circuit 28, as this is shown by way of example in FIG. 1. Alternatively to the shown example, the control circuit 28 can also be integrated in the basic body structure 8 of the carriage support 3. Each support module 7 has a basic body 8a, wherein the support modules 7 are able to be arranged one next to another modularly with their basic bodies 8a, such that the several basic bodies 8a arranged one next to another together form the basic body structure 8.

Preferably each basic body 8a has a rectangular basic outline. This rectangular basic outline is preferably square, as in the exemplary embodiment. Preferably each basic body 8a has four lateral outer surfaces 12 which are at right-angles to one another and which define the basic outline of the basic body 8a.

Within the modular carriage support 3, the support modules 7 are aligned such that two opposite lateral outer surfaces 12 are oriented in the direction of the x-axis and the two other opposite lateral outer surfaces 12 are oriented in the direction of the y-axis respectively.

To form the carriage support 3, the support modules 7 are able to be put together or are put together with the lateral outer surfaces 12 of their basic bodies 8a. In this manner, a carriage support 3 can be formed which is assembled from an arbitrary number of support module columns 7 running in the direction of the x-axis and an arbitrary number of support module columns running in the direction of the y-axis. Preferably each of the four lateral outer surfaces 12 is suitable for the attachment or the putting together of a further support module 7 such that not only regular, but also irregular distribution patterns of support modules 7 are able to be implemented.

The carriage support 3 is equipped with several stator arrangements 13 which serve to provide magnetic travelling fields with which the positioning carriages can be driven. The stator arrangements 13 each comprise a winding arrangement 43 which has, in turn, two winding sections 43a and 43b. At least one winding section 43a is responsible for the generation of a magnetic x-travelling field moveable in the direction of the x-axis for shifting the positioning carriage 2 in the direction of the x-axis and is therefore referred to as an x-winding section 43a. At least one other winding section 43b is responsible for the generation of a magnetic y-travelling field moveable in the direction of the y-axis for shifting the positioning carriage 2 in the direction of the y-axis and is therefore referred to as a y-winding section 43b.

According to the invention, the x-winding section 43a and the y-winding section 43b of each stator arrangement 13 are arranged parallel to the positioning plane 5 and take up at least partially the same xy region in the xy coordinate system such that the x-travelling field and the y-travelling field in this xy region overlap. This means that the x-winding section 43a and the y-winding section 43b overlap. Preferably the two winding sections 43a, 43b therein overlap completely. The overlapping of the winding sections 43a, 43b, in particular, achieves the advantage that the area of the carriage support 3 is used more efficiently and thereby magnetic travelling fields extending over a greater region can be provided both in the direction of the x-axis and in the direction of the y-axis.

Figure 2:
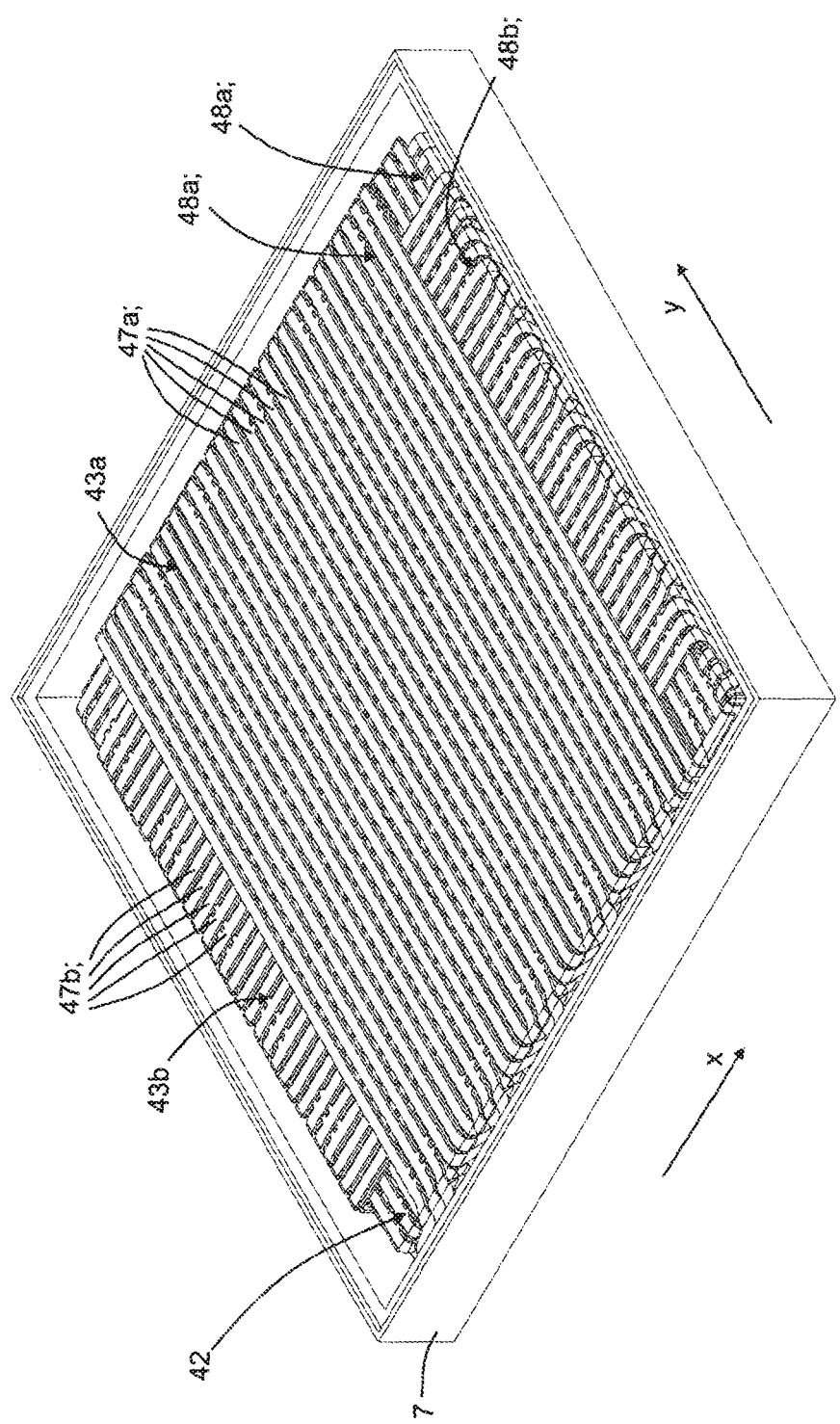

FIG. 2 shows a support module 7 of a positioning system 1. As shown, the x-winding section 43a and the y-winding section 43b overlap; i.e. that they take up the same xy region, such that the x-travelling field and the y-travelling field provided by these winding sections 43a, 43b overlap in this xy region. As shown in FIG. 2, the two winding sections 43a, 43b almost completely overlap. In particular, therein, the overlapping area of the winding sections 43a, 43b is greater than the non-overlapping area of the respective winding sections 43a, 43b. Therefore, the xy region which is taken up by both the x-winding section 43a and the y-winding section 43b, is greater than the xy region which is taken up only by the x-winding section 43a, and is greater than the xy region which is taken up only by the y-winding section 43b.

The x-winding section 43a comprises a plurality of x-wire sections 47a running parallel to the direction of the y-axis, which are arranged on one or more x-planes 48a parallel to the positioning plane 5. Correspondingly, the y-winding section 43b comprises a plurality of y-wire sections 47a running parallel to the direction of the x-axis, which are arranged on one or more y-planes 48b parallel to the positioning plane 5.

As can be seen in FIG. 2, x- and y-planes 48a, 48b lie one over the other in the z-direction—so perpendicular to the xy coordinate system—or are stacked one on the other in the z-direction. The x and y-planes 48a, 48b are arranged alternately in the z-direction.

In the top view, a winding matrix therefore results in which the x-wire sections 47a and the y-wire sections 47b cross in a plurality of crossing points. This is indicated schematically, for example, in FIG. 1.

Through the overlapping of the x-winding section 43a and the y-winding section 43b, several advantages result. A first advantage consists in that through the overlapping, both winding sections can take up almost the entire xy area of the support module 7 and therefore the area of the support module 7 is used efficiently. Magnetic travelling fields can thereby be provided which extend both in the direction of the x-axis and in the direction of the y-axis almost over the entire xy region of the support module 7.

A further advantage consists in that, as described extensively below, the magnetic field resulting from the overlapping of the magnetic travelling fields is particularly well suited to driving a carriage support with a specifically formed coupling arrangement.

Figure 3:
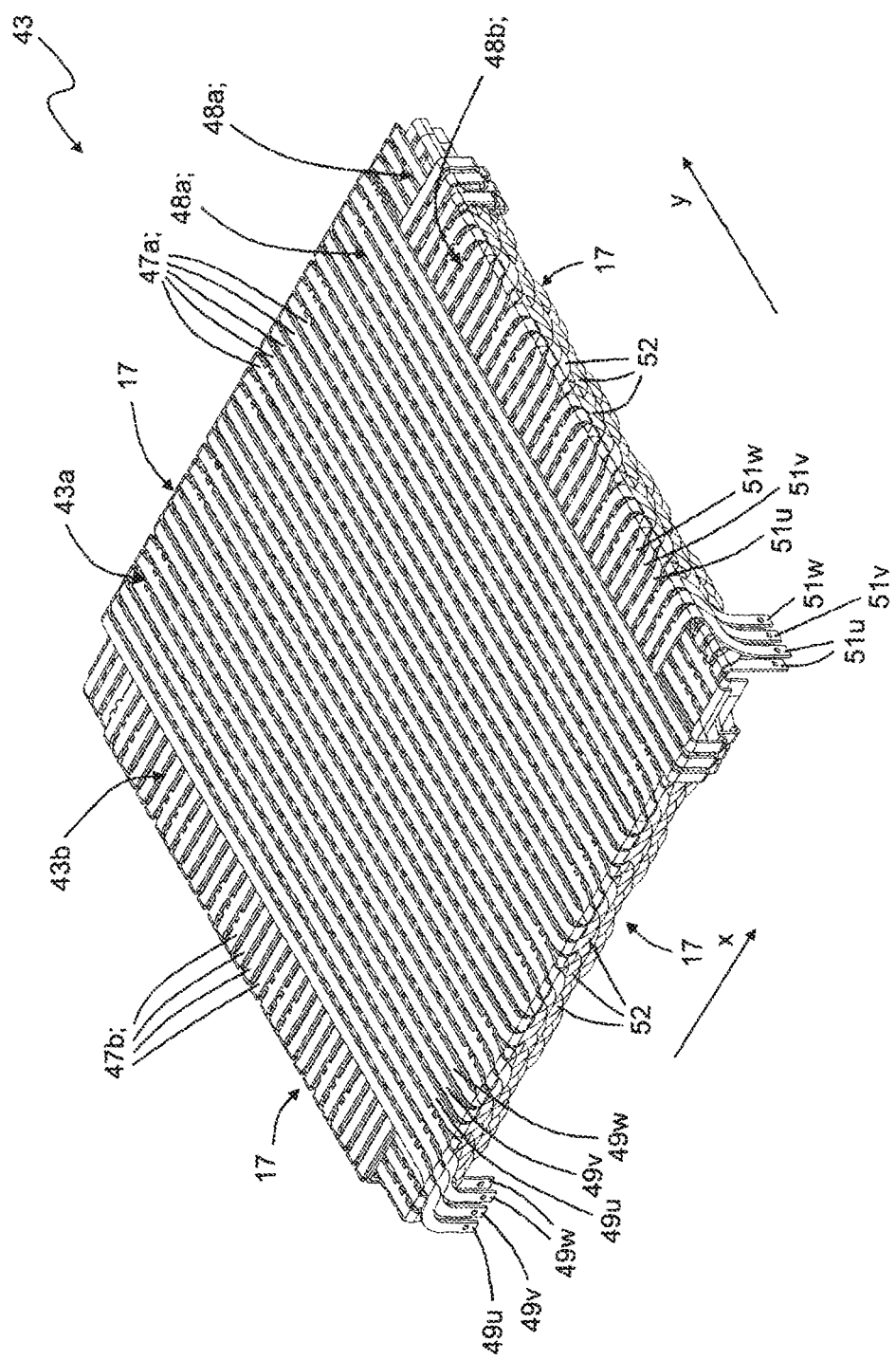
FIG. 3 an isometric depiction of the winding arrangement of the support module shown in FIG. 2.

FIG. 3 shows the x- and y-winding sections 43a, 43b, arranged to overlap, of the support module 7 depicted in FIG. 2. In the shown example, both the x-wire sections 47a and the y-wire sections 47b are divided into three wire section groups respectively. The x-wire sections 47a are therein divided into the wire section groups 49u, 49v and 49w and the y-wire sections 47b are divided into the wire section groups 51u, 51v and 51w. As shown, in the direction of the x-axis, x-wire sections 47a of the wire section groups 49u, 49v and 49w are arranged in a determined order one next to the other, and this order is repeated periodically along the direction of the x-axis. Correspondingly, in the direction of the y-axis, the order of y-wire sections 47b of the wire section groups 51u, 51v and 51w is repeated periodically.

Wire sections of the same wire section group carry the same current. For this, the wire sections are interconnected correspondingly with one another and/or with the control circuit. In the example shown in FIG. 3, the wire sections of the same wire section group are connected to one another in series. For this, two adjacent wire sections of the same wire section group are connected to each other at one side edge 17 of the winding arrangement 43 via a connecting section 52 respectively. The connecting section 52 is therein bent downwards in the z-direction in order to use the present space efficiently. Wire sections of the same wire section group in different x-planes or y-planes are likewise connected to one another in series.

Consequently, an arrangement results in which effectively a single wire per wire section group is present through the series connection of the wire sections of a wire section group, said single wire being arranged in a meandering manner along the direction of the x- or y-axis and running through all associated x or y-planes.

Figure 4:
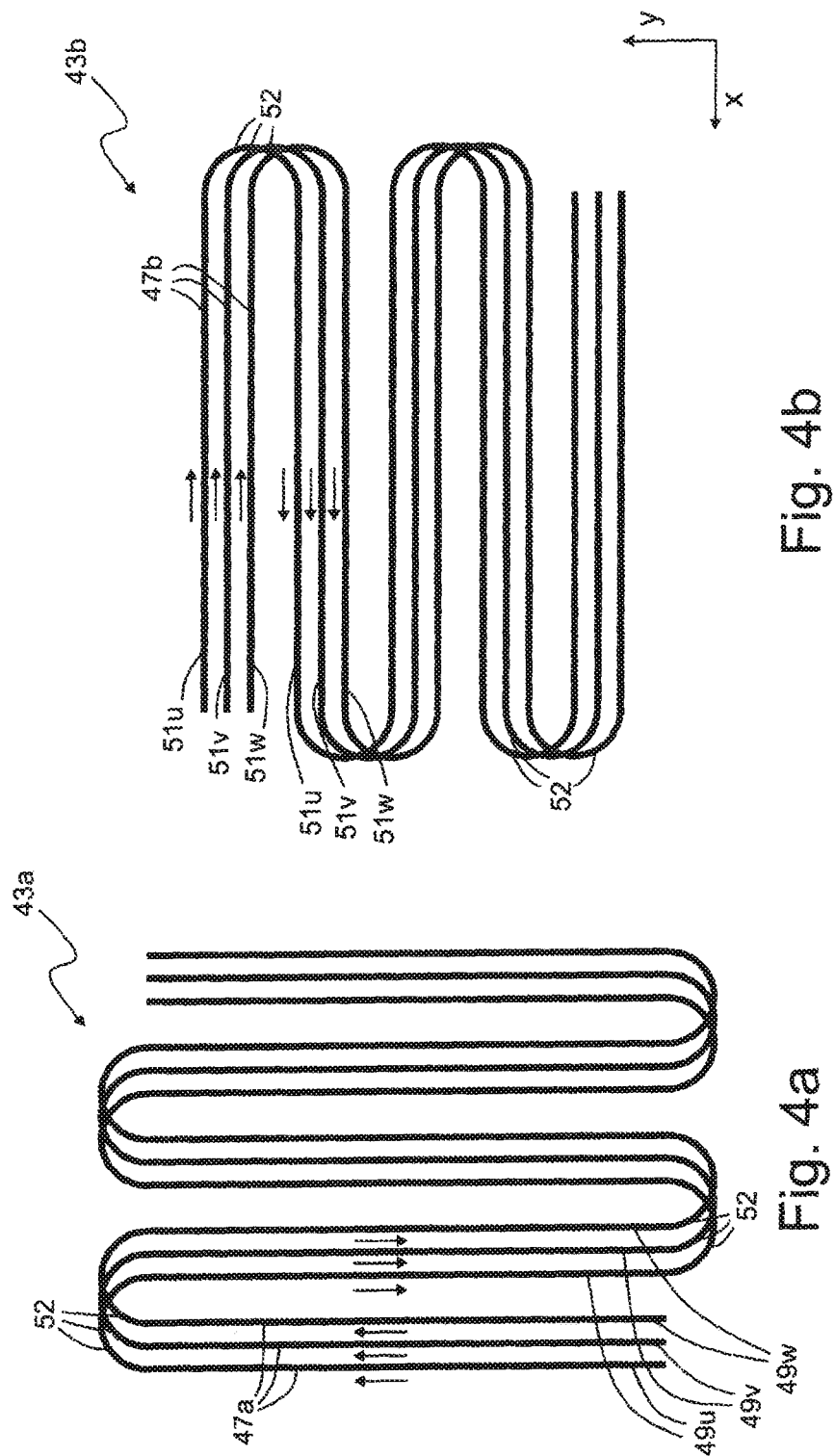
FIG. 4a a schematic depiction of wires in an x-winding section, with a view perpendicular to the xy plane.
FIG. 4b a schematic depiction of wires in a y-winding section, with a view perpendicular to the xy plane.
Figure 5:
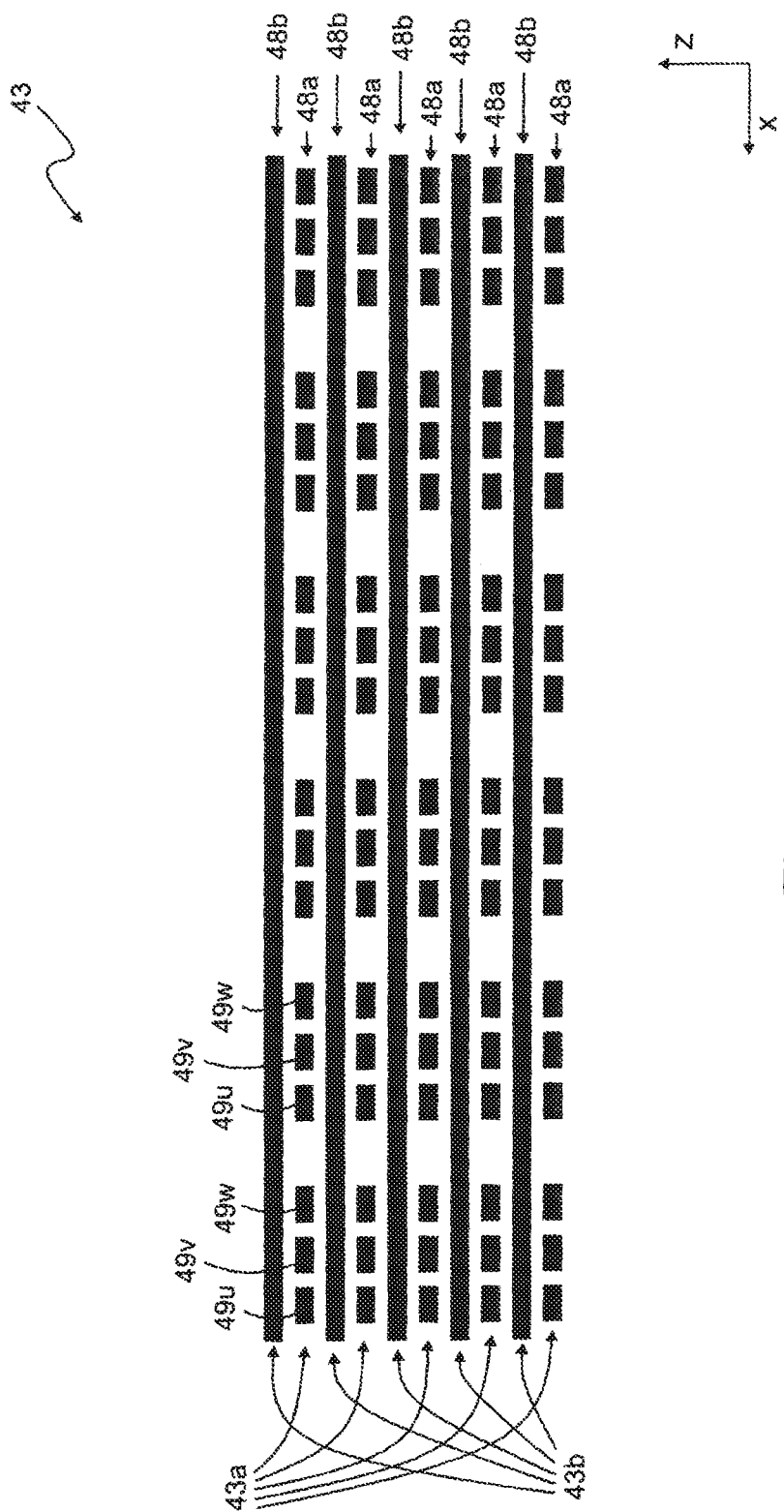
FIG. 5 a schematic depiction of wires of a winding arrangement, with a view perpendicular to an xz plane.

FIGS. 4a and 4b show schematically the arrangement of the wire sections 47a or 47b of the winding sections 43a or 43b. Here the straight sections, running parallel to one another, of the shown wires are referred to as wire sections. As shown, wire sections 47a or 47b of the same wire section group 49u, 49v, 49w or 51u, 51v, 51w are connected to one another via connecting sections 52. Correspondingly, effectively, a single x-wire or y-wire, which is arranged along the direction of the x- or y-axis in a meandering manner, results per wire section group 49u, 49v, 49w or 51u, 51v, 51w. Overall, the shown x-winding section 43a therefore consists of three x-wires arranged in a meandering manner and the shown y-winding section 43a consists of three y-wires arranged in a meandering manner.

FIG. 5 shows a schematic side view of the winding arrangement 43. As can be gathered from FIG. 5, the x-planes 48a of the x-winding section 43a and the y-planes 48b of the y-winding section 43b are stacked alternately in the z-direction. As shown, wire sections 47a of the wire section groups 49u, 49v and 49w are arranged one next to the other in a certain order in the direction of the x-axis, and this order is repeated periodically along the direction of the x-axis.

The already previously introduced control circuit 28 is formed to supply a pre-determined current to each of the x-wires and y-wires independently of one another in order to thus generate the x-travelling field or the y-travelling field. The currents supplied to the x-wires or y-wires are therein preferably phase-shifted with respect to one another such that an x-travelling field or y-travelling field varying along the direction of the x- or y-axis is formed. The x-travelling field therein has, in particular, a plurality of wave fronts parallel to the direction of the y-axis. Preferably the x-travelling field has sections with maximum magnetic field strength along the direction of the x-axis at periodic intervals. The magnetic field direction of these sections preferably alternates along the direction of the x-axis. The sections of maximum field strength are also referred to below as north pole sections and south pole sections. The y-travelling field is formed correspondingly to this in the direction of the y-axis.

Through the described overlapping of the x-winding section 43a and the y-winding section 43b, an overlapping of the x-travelling field and the y-travelling field takes place.

Figure 6:
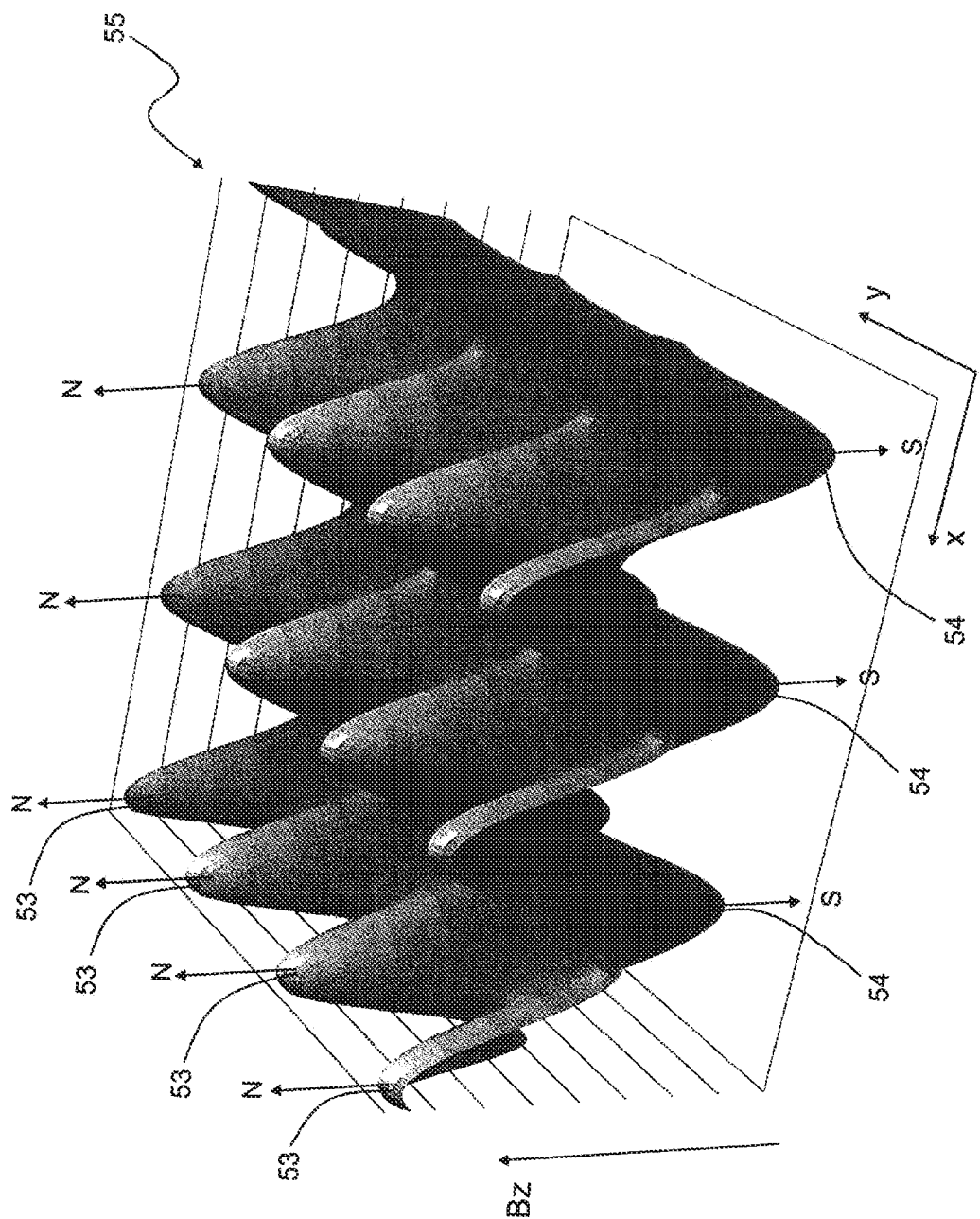
FIG. 6 a schematic depiction of an ideally resulting magnetic field which results from the overlapping of an x-travelling field and a y-travelling field.

In particular, if the magnetic travelling fields have a plurality of north pole and south pole sections respectively, due to the overlapping of the two travelling fields, a resulting magnetic field 55 results, the magnetic field strength of which has a plurality of maxima and minima or north and south pole sections distributed in a matrix-type manner over the overlapping surface or the mutual xy region of the winding sections. FIG. 6 shows an exemplary embodiment of such a magnetic field for the ideal case that the x-travelling field and the y-travelling field are formed sinusoidally respectively. Therein the magnetic field strength Bz—that is, the magnetic field strength in the direction perpendicular to the positioning plane 5—is plotted on the z-axis of the diagram shown in FIG. 10.

In the shown resulting magnetic field 55, the sections of maximum magnetic field strength Bz—so north pole sections 53 and south pole sections 54—are distributed in a plane parallel to the positioning plane 5 and are placed on crossing points of x-grid lines and y-grid lines, which are at right angles to one another, of an imaginary cross grid in such a way that pole sections placed on the same x-grid lines have, among one another, the same pole alignment N, S, and pole sections placed on the same y-grid lines have, among one another, the same pole alignment N, S, wherein the pole alignment N, S of the pole sections 53, 54 alternates in the diagonal direction of the xy coordinate system. As explained below in connection with FIG. 7, the pole section arrangement of the resulting magnetic field 55 thus corresponds to the pole arrangement of the magnet arrangement 23 or the superconductor arrangement 25.

As already referred to above, the drive circuit 28 is formed to control the x-winding section 43a and the y-winding section 43b independently of one another. In this manner, the x-travelling field and the y-travelling field can be moved independently of one another. Through coordinated control of the winding sections 43a, 43b, the direction of the positioning movement 4 can be set. In this manner, not only does the possibility exist to move a positioning carriage 2 selectively in the direction of the x-axis or in the direction of the y-axis, but additionally also with any other movement direction and movement form within the positioning plane 5.

If the positioning system 1, as shown in FIG. 1, comprises several x-winding sections 43a and y-winding sections 43b, then the drive circuit 28 can be designed such that the x-winding sections 43a or the y-winding sections 43b of different support modules 7 can be controlled independently of one another respectively. It is thereby possible, in the case of a carriage support 3 loaded with several positioning carriages 2, to move and to position the positioning carriages 2 independently of one another.

It is quite possible to achieve a positioning system 1 having only a single x-winding section 43a and only a single y-winding section 43b. Such a positioning system 1 then has, for example, the structure illustrated by means of FIGS. 2, 9 and 11, wherein the support module 7 shown here then forms the entire carriage support 3, which is conceived as one unit. The particular advantage of the positioning system 1 is then expressed, however, above all, if the carriage support 3 is equipped with a plurality of stator arrangements 13.

The multiple equipping, which is being described, of the carriage support 3 with stator arrangements 13 has the advantageous effect that the positioning carriage 2 can be moved in a very large positioning region. Therein one and the same positioning carriage 2 can change its drive cooperation with magnetic travelling fields generated by different stator sections 13. The positioning carriage 2 can therefore be transferred during the positioning movement 4 between individual stator arrangements 13. The positioning carriage 2 can thereby also travel longer distances on different routes. This enables a particularly flexible use of the positioning system 1.

During the positioning within the positioning system 1, each positioning carriage 2 can be moved in principle over all present support modules 7.

Each positioning carriage 2 is positioned from above on the carriage support 3 with a lower side 18 in front. Consequently, the lower side 18 of the positioning carriage 2 and the support upper side 6 of the carriage support 3 are facing each other in a vertical direction, which is also referred to as the z-direction and which is at right angles to the xy plane.

The positioning carriage 2 has a coupling arrangement which magnetically interacts with the magnetic travelling fields. Preferably the coupling arrangement is formed as a magnet arrangement 23. Alternatively to this, the coupling arrangement can also be formed as a superconductor arrangement 25. The magnet arrangement 23 or the superconductor arrangement 25 is preferably arranged on the lower side 18 of the positioning carriage 2.

The specific embodiment of the magnet arrangement 23 or of the superconductor arrangement 25 is described below by means of FIG. 7. The embodiment of the magnet arrangement 23 is described first. Subsequently to this, the embodiment of the superconductor arrangement 25 is explained.

Figure 7:
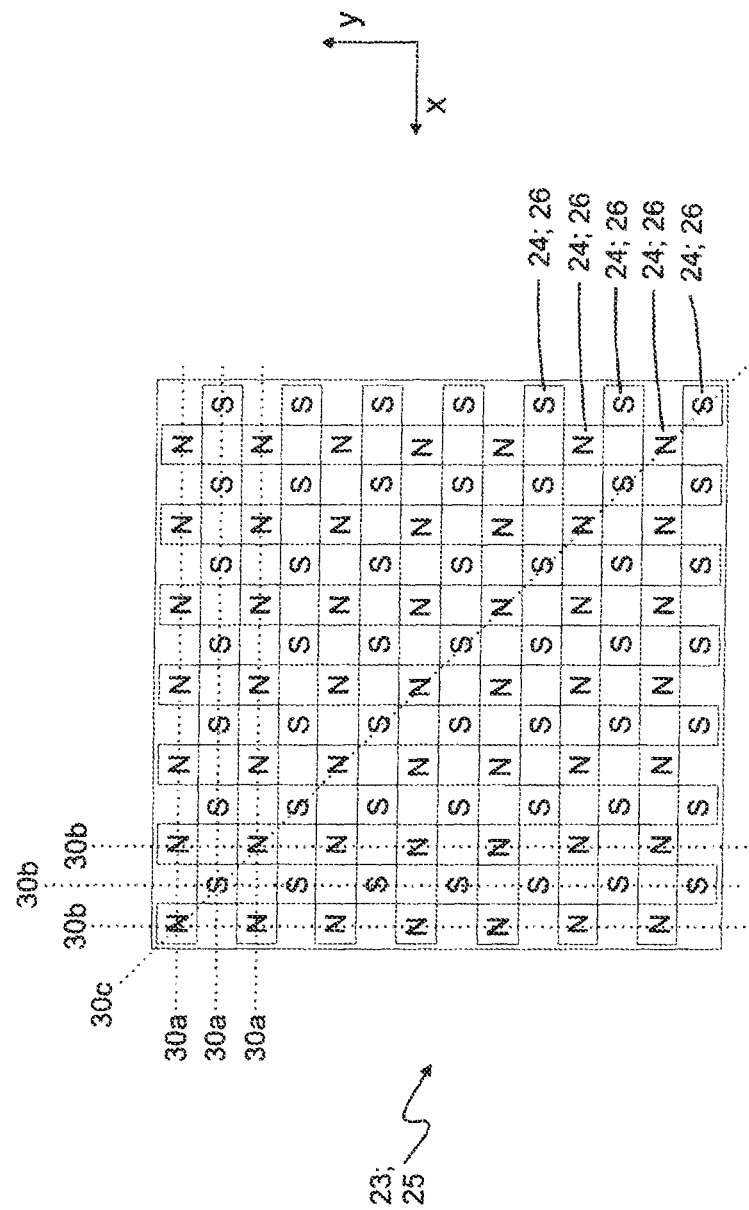
FIG. 7 a top view onto the magnet arrangement or superconductor arrangement arranged on the carriage support, FIG. 8 an isometric depiction of a positioning system in which a plurality of air bearing plates is arranged on the carriage support.

FIG. 7 shows the specific embodiment of the magnet arrangement 23. As shown in FIG. 7, the magnet arrangement 23 is provided with a plurality of magnetic poles 24 which are arranged in the xy plane with regular two-dimensional distribution. Therein, the magnetic poles 24 are placed on crossing points of x-grid lines 30a and y-grid lines 30b, which are at right angles to one another, of an imaginary cross grid in such a way that magnetic poles 24 placed on the same x-grid lines 30a have, among one another, the same pole alignment N, S. This means, on each x-grid line 30a is located only magnetic poles 24 of the same pole alignment respectively.

Correspondingly to this, magnetic poles 24 placed on the same y-grid lines 30b have, among one another, the same pole alignment N, S. The pole alignment N, S of the magnetic poles 24 alternates in the diagonal direction 30c of the xy coordinate system.

The x-grid lines 30a are therein grid lines running in the direction of the x-axis and the y-grid lines 30b are grid lines running in the direction of the y-axis. The x-grid lines 30a cross the y-grid lines 30b at a right angle and all lie in one and the same xy plane. The mutual distance between the respectively adjacent x-grid lines 30a is preferably the same size; also, the mutual distance between the respectively adjacent y-grid lines 30b is the same size. Preferably the distance between the respectively adjacent x-grid lines 30a is also the same size as the mutual distance between the respectively adjacent y-grid lines 30b. Each magnetic pole 24 is preferably at an identical distance with regard to the magnetic poles 24 adjacent to it in the direction of the x-axis and in the direction of the y-axis.

The magnet arrangement 23 expediently has a rectangular outer contour in the xy plane. Preferably the positioning carriage 2, seen in the top view, has a rectangular outline, wherein the magnet arrangement 23 extends up to all four lateral edge regions of the positioning carriage 2.

In the example shown in FIG. 2, 7 magnetic poles are arranged on each x-grid line 30a and y-grid line 30b respectively. Expediently, the number of magnetic poles arranged on the grid lines can also be greater or smaller.

Alternatively to the magnet arrangement 23 described above, the positioning carriage 2 can also comprise a superconductor arrangement 25. Preferably, the superconductor arrangement 25 therein is a superconductor of a second type, in the case of which, whilst using the so-called flux anchoring or the "flux pinning", determined geometries of magnetic fields can be impressed to an extent. Through this impressing it can be achieved that the superconductor adheres to a certain positional relationship to the magnetic travelling fields generated by the carriage support.

Analogously to the magnetic poles 24 of the magnet arrangement 23 described above, the superconductor arrangement therein comprises superconductor sections 26 in which a geometry of a magnetic field with one of two opposite pole alignments N, S is impressed respectively. Therein the superconductor arrangement 25 comprises a first group of superconductor sections 25, in which magnetic field geometries of a first pole alignment N are impressed, and a second group of superconductor sections 25, in which magnetic field geometries of a second pole alignment S opposite to the first pole alignment N are impressed respectively. The superconductor sections 25 are therein distributed in a plane parallel to the positioning plane 5 and placed on crossing points of x-grid lines 30a and y-grid lines 30b, which are at right-angles to one another, of an imaginary cross grid in such a way that superconductor sections 25 placed on the same x-grid lines 30a have, among one another, the same pole alignment N, S, and superconductor sections placed on the same y-grid lines 30b have, among one another, the same pole alignment N, S, wherein the pole alignment of the superconductor sections 25 alternates in the diagonal direction 30c of the xy coordinate system.

With regard to the magnet arrangement 23 or the superconductor arrangement 25 described above, the x- and y-wire sections 47a, 47b of the winding sections 43a, 43b are arranged, in particular, in such a way and/or are energised by the control circuit 28 in such a way that a magnetic field 55 resulting from the overlapping results, the magnetic north and south pole sections of which are arranged in inverse correspondence to the north and south poles of the magnet arrangement 23 or the superconductor arrangement 25 described above. Therefore, each south pole of the magnet arrangement 23 can be carried along by a north pole section 53 of the resulting magnetic field 55 and each north pole of the magnet arrangement 23 can be carried along by a south pole 54 of the resulting magnetic field 55. Through this formation of the resulting magnetic field 55, the magnet arrangement 23 or superconductor arrangement 25 of the positioning carriage can be carried along particularly well by the resulting magnetic field.

Figure 8:
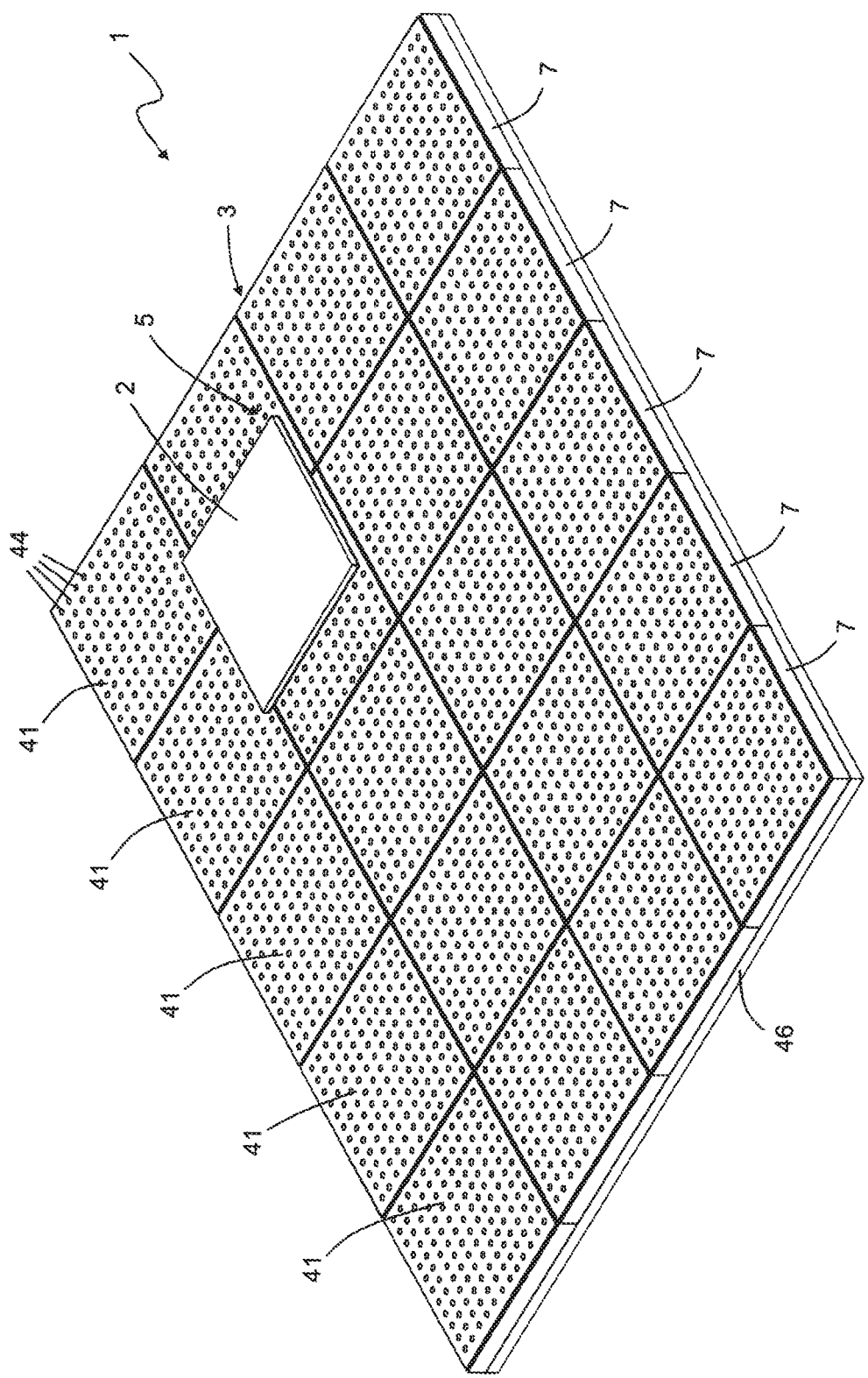

FIG. 8 shows an embodiment of a positioning system 1 in which the carriage support 3 comprises a plurality of support modules 7 arranged one next to another, which are arranged on a support base plate 46. An air bearing plate 41 sits on each support module 7. The air bearing plates 41 have substantially the same outline as the support module such that together they provide an almost continuous bearing surface. Each air bearing plate 41 has a plurality of air outlet openings 44. In operation of the positioning system 1, the support modules 7 are supplied with compressed air which escapes from the air outlet openings 44 and thus provides an air bearing with which the positioning carriage 2 can be supported.

At this point it is mentioned that the air outlet openings 44 are depicted in the Figures purely schematically. The diameter of the air outlet openings 44 has therein been selected to be relatively large for the purpose of better visibility. In fact, the diameter of the air outlet openings can, however, also be dimensioned to be substantially smaller than depicted.

Figure 9:
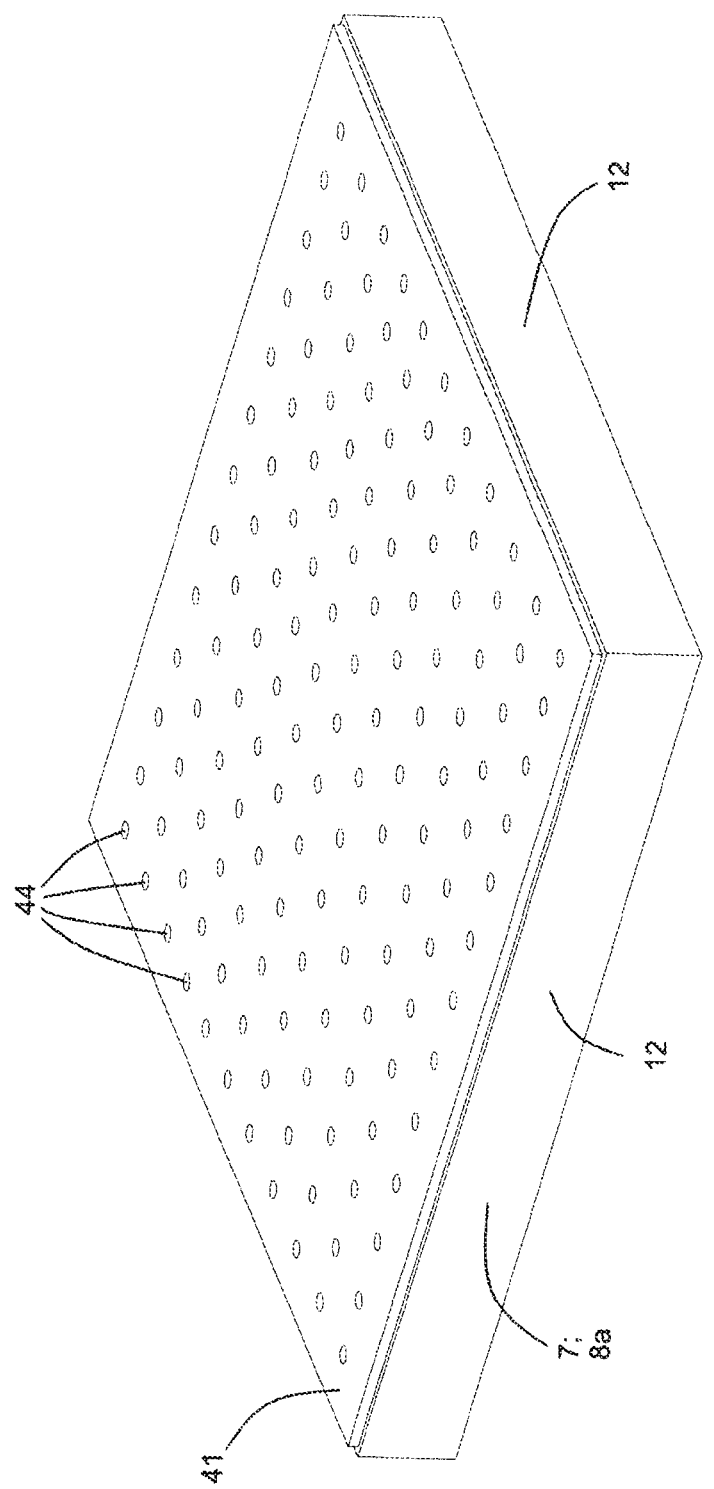
FIG. 9 an isometric depiction of a support module with an air bearing plate.
Figure 10:
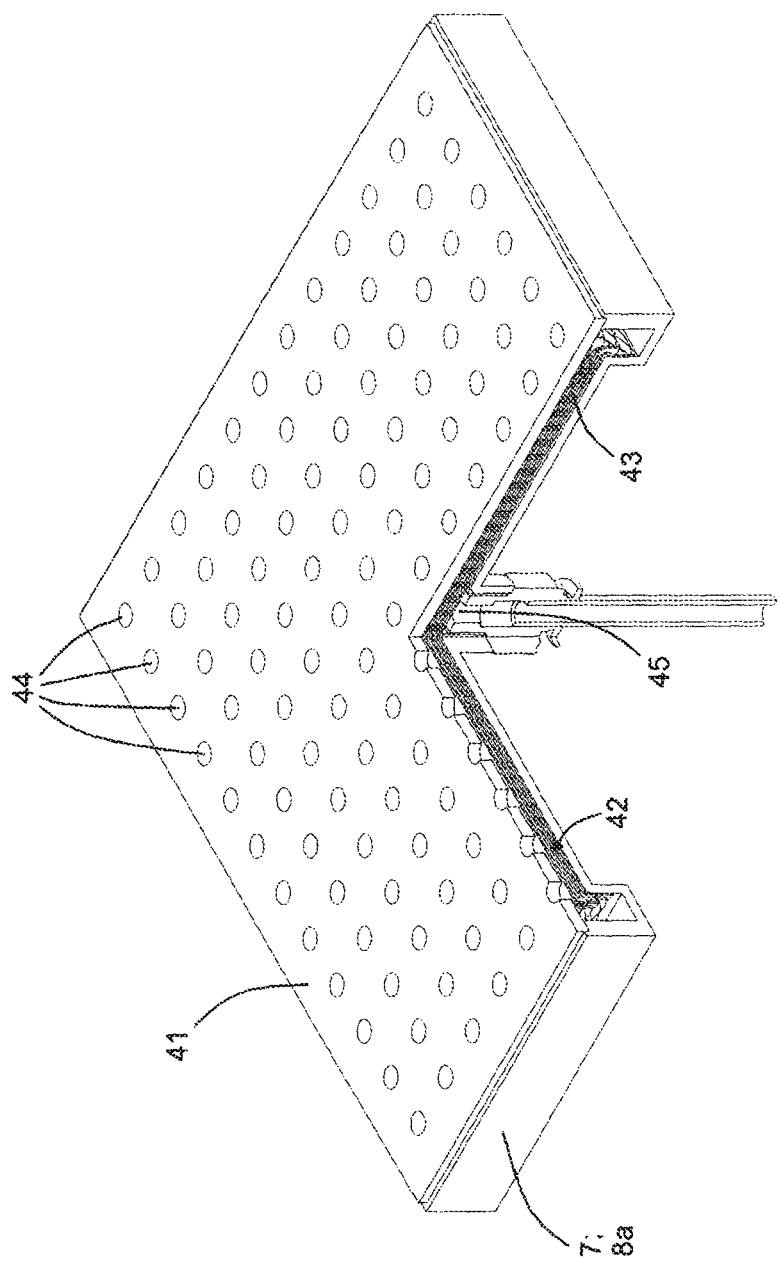
FIG. 10 an isometric sectional depiction of a support module having an air bearing plate and a compressed air inlet.

FIGS. 9, 10 and 11 show a single support module 7 from the positioning system 1 shown in FIG. 8 respectively. FIG. 10 is therein an isometric sectional depiction of a support module 7 and shows, in particular, the winding chamber 42 provided in the support module 7 as well as the winding arrangement 43 accommodated therein. In the shown example, the basic body 8a of the support module 7 is closed downwards to the sides and is designed to be open upwards. Up on the basic body 8a, the air bearing plate 41 is supported, which thus defines, together with the side walls and the base of the basic body 8a, the winding chamber 42. Preferably, the air bearing plate is therein connected to the basic body 8a in an air-tight manner such that compressed air let into the winding chamber 42 can expediently escape only through the air outlet openings 44. As shown in FIGS. 10 and 11, the basic body 8a has a compressed air inlet 45 down on the base, via which supplied compressed air can be let into the winding chamber 42. Since the compressed air inlet 45 is arranged on the side of the winding arrangement 43 opposite the air bearing plate 41, the supplied compressed air inevitably flows through the winding arrangement 43 before it escapes from the air outlet openings. The compressed air supplied for providing the air bearing can therefore be used in an advantageous manner for cooling the winding arrangement 43.

FIG. 12 shows a sectional depiction of two support modules 7 arranged one next to another. As can be seen in FIG. 7, the support modules 7 and the positioning carriage 2 are designed in such a way that the positioning carriage 2 can be conveyed from a carriage module 7 to an adjacent support module 7.

In particular, the support modules 7 are aligned in alignment with one another in the z-direction. Furthermore, the respective winding arrangements 43 are designed or are controlled in such a way that the positioning carriage 2 can be driven simultaneously by magnetic travelling fields of both support modules 7. For this purpose, the respective winding arrangements 43 are designed in such a way or are controlled in such a way that the magnetic travelling field of the one support module 7 is the same as an imaginary periodic continuation of the adjacent support module 7 or corresponds to this. This is indicated in FIG. 12 by the arrows which are to symbolise, on the one hand, the magnetic poles 24 of the magnet arrangement 23 alternating along the x-axis in projection on the xz plane, and on the other hand the pole sections of the resulting magnetic field 55 likewise alternating along the x-axis in projection on the xz plane.

The carriage support 3 can be equipped at one or at several points with sensor means which enable a position detection of the at least one positioning carriage 2, and indeed expediently separately for the current position in the direction of the x-axis and the current position in the direction of the y-axis. Corresponding position detection means can, for example, work on an optical or magnetic basis.

The positioning carriages 2 are able to be used depending on the embodiment in order to directly support products to be supplied for a certain purpose or also in order to receive separate product support means which can be loaded with products. A possible application case is the use of the positioning carriage 2 to support so called microtiter plates which are used in laboratory automation in order to store fluid samples. Independently of in which form a positioning carriage 2 is able to be equipped or is equipped with one or more products, the positioning carriage 2—in particular on its lower side 18—can be provided with a readable coding, which enables a product identification and which is able to be read by a, for example, identification device arranged on the carriage support 3 at a determined point or at several points. Such a coding can also be used for position control.

In particular in the case of large transport systems, the positioning system 1 can also be equipped with RFID identification means.

The invention claimed is:

1. A The positioning system comprising at least one positioning carriage which is variably movable and positionable relative to a carriage support of the positioning system, whilst carrying out a positioning movement on a positioning plane defined by an xy cartesian coordinate system,
   wherein the carriage support has at least one stator arrangement comprising a winding arrangement, which has an x-winding section for providing a magnetic x-travelling field, which can be moved in the direction of the x-axis of the xy coordinate system, and a y-winding section for providing a magnetic y-travelling field, which can be moved in the direction of the y-axis of the xy coordinate system, and
   wherein the positioning carriage is provided with a coupling arrangement, which, during the positioning movement, magnetically interacts simultaneously with the x-travelling field and the y-travelling field, and the positioning carriage can be driven to carry out a positioning movement in the direction of the x-axis of the xy coordinate system by the movement of the x-travelling field and to carry out a positioning movement in the direction of the y-axis of the xy coordinate system by the movement of the y-travelling field, and
   wherein the x-winding section and the y-winding section are arranged parallel to the positioning plane and take up, at least partially, the same xy region in the xy coordinate system, such that the x-travelling field and the y-travelling field overlap in this xy region, and
   wherein the x-winding section comprises a plurality of x-wire sections running in the direction of the y-axis and arranged one next to the other on an x-plane parallel to the positioning plane, the y-winding section comprises a plurality of y-wire sections running in the direction of the x-axis and arranged one next to the other on a y-plane parallel to the positioning plane, and the x-wire sections and the y-wire sections are arranged one over the other in the direction perpendicular to the positioning plane, such that, in the top view onto the xy coordinate system, a plurality of crossing points results between the x-wire sections and the y-wire sections, and
   wherein the xy region which is taken up by both the x-winding section and the y-winding section is greater than the xy region which is taken up only by the x-winding section, and is greater than the xy region which is taken up only by the y-winding section.

2. The positioning system according to claim 1, wherein a plurality of x-planes and y-planes is provided, which are stacked alternately one over the other in the direction perpendicular to the positioning plane.

3. The positioning system according to claim 2, wherein the x-wire sections are divided into different x-wire section groups respectively, x-wire sections of different x-wire section groups are arranged one next to the other on an x-plane, and this arrangement is repeated periodically along the direction of the x-axis, wherein two x-wire sections of the same x-wire section group are connected to each other at a side edge of the winding arrangement via a connecting section respectively, and the y-wire sections are divided into different y-wire section groups respectively, y-wire sections of different y-wire section groups are arranged one next to the other in a y-plane, and this arrangement is repeated periodically along the direction of the y-axis, wherein two y-wire sections of the same y-wire section group are connected to each other at a side edge of the winding arrangement via a connecting section respectively.

4. The positioning system according to claim 3, wherein the connecting sections are bent upwards or downwards in the direction perpendicular to the positioning plane.

5. The positioning system according to claim 3, wherein x-wire sections of the same x-wire section group of different x-planes are connected to one another, and y-wire sections of the same y-wire section group of different y-planes are connected to one another.

6. The positioning system according to claim 2, wherein the x-wire sections of the same x-wire section group of all x-planes are connected to one another in series, such that they form a single continuous x-wire, and the y-wire sections of the same y-wire section group of all y-planes are connected to one another in series, such that they form a single continuous y-wire.

7. The positioning system according to claim 1, wherein the coupling arrangement is a magnet arrangement, which has a plurality of magnetic poles distributed on a plane parallel to the positioning plane, said poles being placed on crossing points of x-grid lines and y-grid lines, which are at right angles to one another, of an imaginary cross grid, in such a way that magnetic poles placed on the same x-grid lines have, among one another, the same pole alignment, and magnetic poles placed on the same y-grid lines have, among one another, the same pole alignment, wherein the pole alignment of the magnetic poles alternate in the diagonal direction of the xy coordinate system.

8. The positioning system according to claim 1, wherein the coupling arrangement is a superconductor arrangement.

9. The positioning system according to claim 8, wherein the superconductor arrangement comprises a first group of superconductor sections in which magnetic field geometries of a first pole alignment are impressed respectively, and comprises a second group of superconductor sections in which magnetic field geometries of a second pole alignment opposite to the first pole alignment are impressed respectively, wherein the superconductor sections are distributed on a plane parallel to the positioning plane and are placed on crossing points of x-grid lines and y-grid lines, which are at right angles to one another, of an imaginary cross grid in such a way that superconductor sections placed on the same x-grid lines have, among one another, the same pole alignment, and superconductor sections placed on the same y-grid lines have, among one another, the same pole alignment, wherein the pole alignment of the superconductor sections alternate in the diagonal direction of the xy coordinate system.

10. The positioning system according to claim 1, wherein the bearing device has an air bearing plate, which has a plurality of air outlet openings on the side facing towards the positioning carriage for providing an air bearing supporting the positioning carriage.

11. The positioning system according to claim 10, wherein the carriage support has at least one winding chamber in which the winding arrangement is arranged, wherein the winding chamber is closed towards the positioning carriage by the air bearing plate and has a compressed air inlet on the side of the winding arrangement facing away from the air bearing plate, such that air bearing compressed air provided at the compressed air inlet must flow through the winding chamber and the winding arrangement in order to reach the air outlet openings.

12. A positioning system comprising at least one positioning carriage which is variably movable and positionable relative to a carriage support of the positioning system, whilst carrying out a positioning movement on a positioning plane defined by an xy cartesian coordinate system, wherein the carriage support has at least one stator arrangement comprising a winding arrangement, which has an x-winding section for providing a magnetic x-travelling field, which can be moved in the direction of the x-axis of the xy coordinate system, and a y-winding section for providing a magnetic y-travelling field, which can be moved in the direction of the y-axis of the xy coordinate system, and wherein the positioning carriage is provided with a coupling arrangement, which, during the positioning movement, magnetically interacts simultaneously with the x-travelling field and the y-travelling field, and the positioning carriage can be driven to carry out a positioning movement in the direction of the x-axis of the xy coordinate system by the movement of the x-travelling field and to carry out a positioning movement in the direction of the y-axis of the xy coordinate system by the movement of the y-travelling field, and wherein the x-winding section and the y-winding section are arranged parallel to the positioning plane and take up, at least partially, the same xy region in the xy coordinate system, such that the x-travelling field and the y-travelling field overlap in this xy region, and wherein the x-winding section comprises a plurality of x-wire sections running in the direction of the y-axis and arranged one next to the other on an x-plane parallel to the positioning plane, the y-winding section comprises a plurality of y-wire sections running in the direction of the x-axis and arranged one next to the other on a y-plane parallel to the positioning plane, and the x-wire sections and the y-wire sections are arranged one over the other in the direction perpendicular to the positioning plane, such that, in the top view onto the xy coordinate system, a plurality of crossing points results between the x-wire sections and the y-wire sections, and wherein the carriage support is provided with a control circuit, which is formed to supply several currents, which are phase-shifted with respect to one another, to at least one x-winding section and at least one y-winding section for providing the respective travelling field.

13. A positioning system comprising at least one positioning carriage which is variably movable and positionable relative to a carriage support of the positioning system, whilst carrying out a positioning movement on a positioning plane defined by an xy cartesian coordinate system, wherein the carriage support has at least one stator arrangement comprising a winding arrangement, which has an x-winding section for providing a magnetic x-travelling field, which can be moved in the direction of the x-axis of the xy coordinate system, and a y-winding section for providing a magnetic y-travelling field, which can be moved in the direction of the y-axis of the xy coordinate system, and wherein the positioning carriage is provided with a coupling arrangement, which, during the positioning movement, magnetically interacts simultaneously with the x-travelling field and the y-travelling field, and the positioning carriage can be driven to carry out a positioning movement in the direction of the x-axis of the xy coordinate system by the movement of the x-travelling field and to carry out a positioning movement in the direction of the y-axis of the xy coordinate system by the movement of the y-travelling field, and wherein the x-winding section and the y-winding section are arranged parallel to the positioning plane and take up, at least partially, the same xy region in the xy coordinate system, such that the x-travelling field and the y-travelling field overlap in this xy region, and wherein the x-winding section comprises a plurality of x-wire sections running in the direction of the y-axis and arranged one next to the other on an x-plane parallel to the positioning plane, the y-winding section comprises a plurality of y-wire sections running in the direction of the x-axis and arranged one next to the other on a y-plane parallel to the positioning plane, and the x-wire sections and the y-wire sections are arranged one over the other in the direction perpendicular to the positioning plane, such that, in the top view onto the xy coordinate system, a plurality of crossing points results between the x-wire sections and the y-wire sections, and wherein the carriage support comprises a plurality of support modules, which are able to be arranged next to one another or are arranged next to one another modularly in the direction of the x-axis and/or in the direction of the y-axis and each of which contains an x-winding section and a y-winding section, wherein one and the same positioning carriage can be moved during its positioning movement over several and expediently over all the support modules.

* * * * *